(12) United States Patent
Gillespie et al.

(10) Patent No.: US 9,076,264 B1
(45) Date of Patent: Jul. 7, 2015

(54) SOUND SEQUENCING SYSTEM AND METHOD

(75) Inventors: Art Gillespie, Tucson, AZ (US);
Brendan Regan, Boston, MA (US);
Jeremy Todd, Cambridge, MA (US)

(73) Assignee: iZotope, Inc., Cambridge, MA (US)

( * ) Notice: Subject to any disclaimer, the term of this patent is extended or adjusted under 35 U.S.C. 154(b) by 800 days.

(21) Appl. No.: 12/537,238

(22) Filed: Aug. 6, 2009

(51) Int. Cl.
*G06T 11/40* (2006.01)
*G06T 11/20* (2006.01)
*G06T 19/00* (2011.01)

(52) U.S. Cl.
CPC ............. *G06T 11/206* (2013.01); *G06T 19/00* (2013.01)

(58) Field of Classification Search
CPC ....... G06T 11/206; G06T 11/20; G06T 19/00; G06T 11/203; G06T 11/60; G06T 2200/24; G06T 2207/10016; G06F 3/0481; G06F 17/30572; G06F 17/30716; G06F 17/30769; G06F 17/30772; G06F 17/30905
USPC .......................... 345/440, 619, 629, 581, 173
See application file for complete search history.

(56) References Cited

U.S. PATENT DOCUMENTS

| | | | | |
|---|---|---|---|---|
| 5,247,375 A * | 9/1993 | Mochizuki et al. | ............. | 349/84 |
| 6,075,197 A * | 6/2000 | Chan | ............... | 84/730 |
| 6,222,549 B1 * | 4/2001 | Hoddie | ........... | 345/419 |
| 6,546,065 B1 * | 4/2003 | Shimosakoda | ............... | 375/364 |
| 7,034,217 B2 * | 4/2006 | Pachet | ............. | 84/609 |
| 7,148,415 B2 * | 12/2006 | Lengeling et al. | ............. | 84/611 |
| 7,161,080 B1 * | 1/2007 | Barnett | ........................... | 84/613 |
| 7,379,601 B2 * | 5/2008 | Yang et al. | .................... | 382/224 |
| 7,536,257 B2 * | 5/2009 | Nishibori et al. | ............. | 701/419 |
| 7,663,049 B2 * | 2/2010 | Puryear | .......................... | 84/609 |
| 8,013,864 B2 * | 9/2011 | Foslien | ........................ | 345/589 |
| 8,274,510 B2 * | 9/2012 | Demchak et al. | ............. | 345/420 |
| 2002/0170415 A1 * | 11/2002 | Hruska et al. | .................. | 84/609 |
| 2003/0022144 A1 * | 1/2003 | Cliff | ............................ | 434/319 |
| 2006/0016322 A1 * | 1/2006 | Randle et al. | ................... | 84/612 |
| 2006/0022956 A1 * | 2/2006 | Lengeling et al. | ............. | 345/173 |
| 2006/0053342 A1 * | 3/2006 | Bazakos et al. | ................. | 714/37 |
| 2006/0059513 A1 * | 3/2006 | Tang et al. | ....................... | 725/37 |
| 2006/0176403 A1 * | 8/2006 | Gritton et al. | ................. | 348/581 |
| 2006/0179065 A1 * | 8/2006 | Xu | ................................. | 707/100 |
| 2006/0184966 A1 * | 8/2006 | Hunleth et al. | .................. | 725/39 |
| 2006/0278058 A1 * | 12/2006 | Lengeling | ....................... | 84/173 |
| 2007/0008299 A1 * | 1/2007 | Hristov | ......................... | 345/173 |
| 2007/0054735 A1 * | 3/2007 | Palermo | ......................... | 463/30 |
| 2007/0107585 A1 * | 5/2007 | Leahy et al. | .................... | 84/616 |
| 2007/0168413 A1 * | 7/2007 | Barletta et al. | ................ | 709/203 |
| 2007/0182665 A1 * | 8/2007 | Tanaka et al. | .................. | 345/34 |

(Continued)

FOREIGN PATENT DOCUMENTS

WO WO 2005/104549 A1 * 11/2005 ............................ 7/6

OTHER PUBLICATIONS

Using MIDI to modify video game content Jukka Holm, Juha Arrasvuori, Kai Havukainen Jun. 2006.*

*Primary Examiner* — Javid A Amini
(74) *Attorney, Agent, or Firm* — David Lowry (57) ABSTRACT

A system and method for displaying, playing and modifying song and percussion sequences. Users can easily view and modify such sequences using a User Interface (UI), including while the sequences are playing. A user may quickly "zoom in" on specific sounds and rhythms, and modify the sound and/or rhythm while it plays. Users can also "zoom out" to view and manipulate a song at a pattern level, or at a song level with multiple sections of different sounds and rhythms.

15 Claims, 6 Drawing Sheets

(56) References Cited

U.S. PATENT DOCUMENTS

| | | | |
|---|---|---|---|
| 2007/0192739 A1* | 8/2007 | Hunleth et al. | 715/823 |
| 2007/0238065 A1* | 10/2007 | Sherwood et al. | 433/24 |
| 2007/0281767 A1* | 12/2007 | Fan | 463/9 |
| 2008/0027689 A1* | 1/2008 | Jandhyala et al. | 703/2 |
| 2008/0253608 A1* | 10/2008 | Long et al. | 382/100 |
| 2008/0263012 A1* | 10/2008 | Jones | 707/3 |
| 2009/0027338 A1* | 1/2009 | Weinberg et al. | 345/158 |
| 2009/0043410 A1* | 2/2009 | Evans et al. | 700/94 |
| 2009/0061837 A1* | 3/2009 | Chaudhri et al. | 455/418 |
| 2009/0063557 A1* | 3/2009 | MacPherson | 707/103 R |
| 2009/0064848 A1* | 3/2009 | Henkel | 84/483.2 |
| 2009/0066638 A1* | 3/2009 | Moulios et al. | 345/156 |
| 2009/0067641 A1* | 3/2009 | Lengeling et al. | 381/80 |
| 2009/0114079 A1* | 5/2009 | Egan | 84/477 R |
| 2009/0125831 A1* | 5/2009 | Dandurand | 715/772 |
| 2009/0258700 A1* | 10/2009 | Bright et al. | 463/31 |
| 2010/0082768 A1* | 4/2010 | Edwards et al. | 709/217 |
| 2010/0132536 A1* | 6/2010 | O'Dwyer | 84/609 |
| 2010/0162878 A1* | 7/2010 | Lengeling et al. | 84/483.2 |
| 2010/0218097 A1* | 8/2010 | Herberger et al. | 715/716 |
| 2010/0282847 A1* | 11/2010 | Lei et al. | 235/438 |
| 2010/0306657 A1* | 12/2010 | Derbyshire et al. | 715/727 |
| 2011/0004467 A1* | 1/2011 | Taub et al. | 704/207 |
| 2011/0010671 A1* | 1/2011 | Harma et al. | 715/835 |
| 2011/0011246 A1* | 1/2011 | Buskies et al. | 84/613 |
| 2011/0018841 A1* | 1/2011 | Hristov | 345/174 |
| 2011/0044522 A1* | 2/2011 | Fancourt et al. | 382/131 |
| 2011/0100198 A1* | 5/2011 | Gatzsche et al. | 84/615 |
| 2012/0083249 A1* | 4/2012 | Dunnam et al. | 455/413 |
| 2012/0173977 A1* | 7/2012 | Walker et al. | 715/716 |

* cited by examiner

SOUND SEQUENCING SYSTEM AND METHOD

FIELD OF THE INVENTION

The invention relates generally to user interfaces. More specifically, the invention is directed towards a display and interactive user interface for musical sequencers.

BACKGROUND OF THE INVENTION

Drum machines and sequencers have existed for many years. These devices play percussion and other sounds and samples in a rhythm pattern as controlled by a user. Typical output is an audio percussion track that can be played or recorded. New drum machines have been produced in software that run on general purpose computers, or in specialized sequence machines with input pads.

Many such drum machines provide a simple way to play beats, such as by striking an input pad or switch based on real-time, in that the user hits the pad just like a real drum in order to produce a sound. With other sequencers, a timeline is presented, allowing a user to indicate points on the timeline, so that when the sequencer is activated, the notes occur at according to the sequence on the timeline.

Modern devices such as personal digital assistants (PDAs), cell phones, music players have increased in memory and computer power and can run more powerful applications. Many of these devices have different types of inputs, including touch screens.

However, such touch screens are small and hard to present large amounts of information in a coherent, usable way. In the case of drum machines, presenting data varying from a single instrument beat to a complicated sequence with several sounds, and long sequences, is very difficult.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention may provide a novel system and method for displaying song and percussion sequences, and allowing users to easily view and modify such sequences, including while the sequences are playing. A user may quickly focus in on specific sounds and rhythms, and modify the sound and/or rhythm while it plays. Users may also "zoom out" to view and manipulate a song at a pattern level, or at a song level with multiple sections of different sounds and rhythms. An intuitive feel is provided that enables users to utilize an embodiment with little or no learning process.

One or more embodiments may include a user interface display for an audio sequencing device, that includes a part view comprising a matrix of squares, wherein each square in the matrix visually indicates whether a specific sound is to be played; and a pattern view comprising a matrix of squares, wherein at least one square within the matrix displays a part related to the pattern view; and wherein a user may switch from the pattern view and a selected part view.

The parts view may show parts in different colors based on a type of instrument related to the audio sound. The squares in the part view matrix may visually indicate a volume for the audio sound when the sequence is played. A square in the matrix may indicate a volume level by one or more lines that substantially fill the square for a high volume level indication, wherein consecutively fewer lines indicate a lower volume level. When the sound pattern is being played, the part view matrix squares may be highlighted sequentially as the indicated audio sound is played.

One or more embodiments may include a song view, comprising a matrix of squares wherein at least one square within the matrix comprises a pattern view. An embodiment may include an input feature wherein a user may indicate a tempo by sequentially activating the input feature at a speed to indicate the desired tempo.

One or more embodiments may comprise a method or process of displaying a sequence of sounds to be played, including displaying by a processor, a pattern view on a display device, wherein the pattern view comprises a matrix of squares, wherein at least one square within the matrix displays a part view; and upon receiving a signal, enlarging and displaying by a processor one of the part views on the display device, wherein the part view comprises a matrix of squares, and wherein each square in the matrix visually indicates whether a specific sound is played at a specific time in a sequence.

If in play mode, displaying the parts view may include sequentially highlighting each of the squares, and simultaneously producing audio output if the highlighted square indicates that the specific sound should be played. Such audio output may be produced at a volume level as indicated in the highlighted square. Further if in play mode, displaying a pattern view may include for each part view in the pattern view, sequentially highlighting each square in the part view, and simultaneously producing audio output if the highlighted square indicates that the specific sound should be played; wherein sequentially highlighting of each square in the part view is synchronized for all part views displayed in the pattern view.

One or more embodiments may include a process of displaying by a processor, a song view on the display device, wherein the song view comprises a matrix of squares, wherein at least one square within the matrix displays a pattern view.

One or more embodiments may include a computer readable medium including executable instructions that when provided to a processor, cause the processor to perform displaying a pattern view on a display device, wherein the pattern view comprises a matrix of squares, wherein at least one square within the matrix displays a part view; and upon receiving a signal, enlarging and displaying one of the part views on the display device, wherein the part view comprises a matrix of squares, and wherein each square in the matrix visually indicates whether a specific sound is played at a specific time in a sequence.

One or more embodiments may include executable instructions to cause a processor to perform when displaying a part view, sequentially highlighting each of the squares, and simultaneously producing audio output if the highlighted square indicates that the specific sound should be played, if in play mode. Further, one or more embodiments may include executable instructions to cause a processor to perform when displaying a pattern view while in play mode, for each part view in the pattern view, sequentially highlighting each square in the part view, and simultaneously producing audio output if the highlighted square indicates that the specific sound should be played, wherein sequentially highlighting of each square in the part view is synchronized for all part views displayed in the pattern view.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
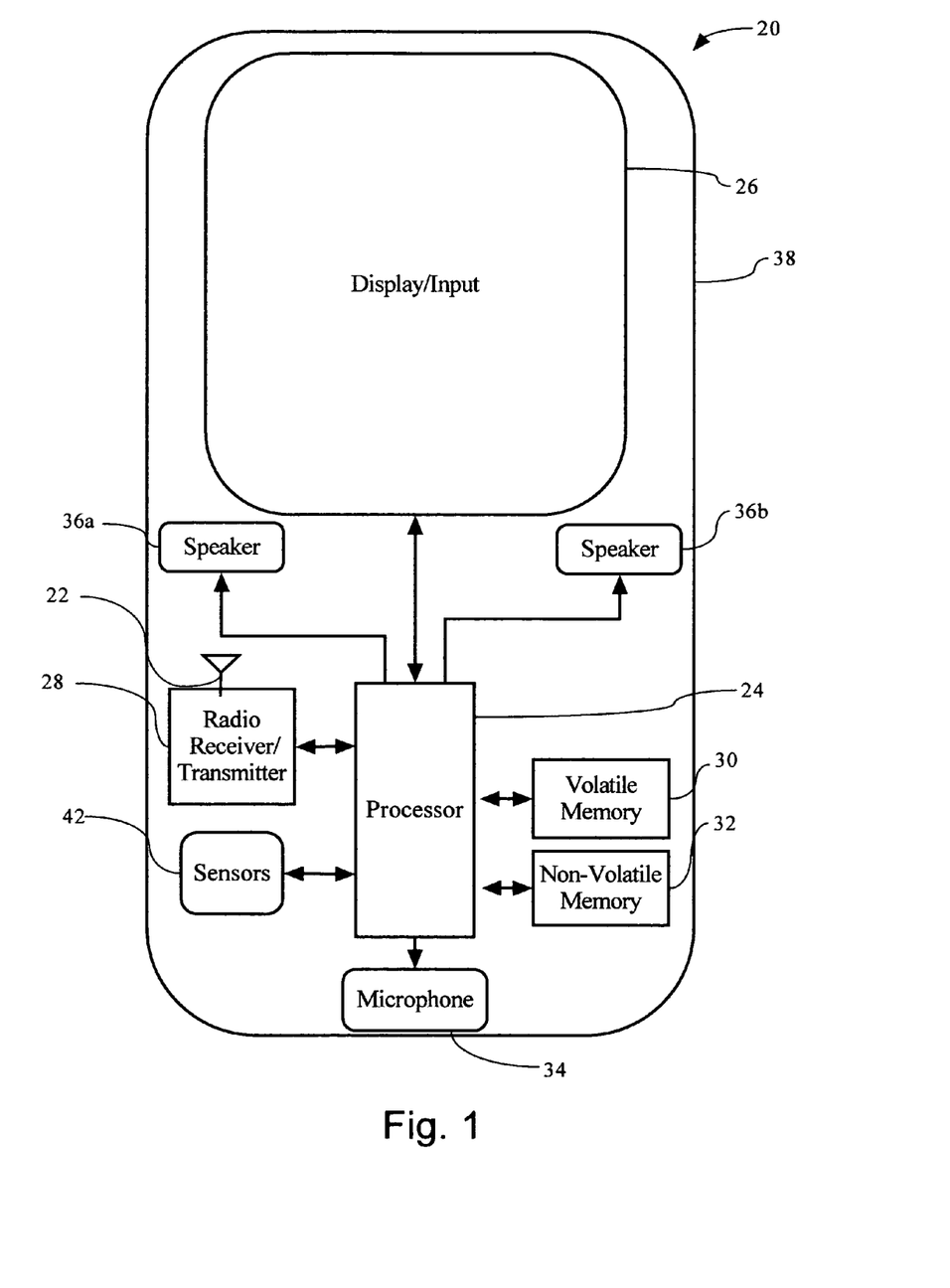
FIG. 1 illustrates an example apparatus on which one or more embodiments may be utilized.

FIG. 1 illustrates a device 20 that may benefit from embodiments of the present invention. Device 20 may comprise a network-enabled wireless device, such as a cellular phone, mobile device, data terminal, a pager, laptop computer, or any non-networked device such as a PDA (personal digital assistant), gaming device, music or video playback device, computer, or combinations thereof. Further, the device 20 may comprise any combination of network-enabled wireless devices and non network-enabled devices. As a network-enabled device, the device 20 may communicate using one or more antennas 22 over a radio link to a wireless network (not shown) and through gateways and web servers. Examples of wireless networks include third-generation (3G) cellular data communications networks, Global System for Mobile communications networks (GSM), WLAN networks, or other wireless communication networks. Device 20 may also communicate with a web server using one or more ports (not shown) that may allow a wired connection to the Internet, such as universal serial bus (USB) connection, and/or via a short-range wireless connection (not shown), such as a BLUETOOTH™ link or a wireless connection to WLAN access point. Thus, device 20 may be able to communicate with a web server in multiple ways.

As shown in FIG. 1, the device 20 may include a processor 24 and various types of memory, such as volatile memory 30 and non-volatile memory 32. The memory 30, 32 may store data and information and also instructions to be executed by the processor 24 to control the device 20 and enable applications to be performed on or by it. The device 20 may also include a radio transmitter/receiver 28 in communication with the processor 24 that enables wireless communications, as previously described. The radio transmitter/receiver 28 may also receive GPS transmissions and communicate with processor 24 to enable the processor to determine current location information for device 20. Other positioning systems and methods may be utilized.

The device 20 may also include a display 26 to visually display information, images, text and other data. User input may be provided through the display 20, such as by touch screen, pointer device, etc. The display 20 may be of any size and shape. The device 20 may also include one or more speakers 36 to provide mono or stereo sound output to a user, to play all types of audio including received telephone audio, and audio and music received from broadcasted signals, or stored in the memories 30, 32. Audio output may also be provided by ports or connections (not shown) to allow external devices to play the audio, such as headphone jacks, wireless transmission, etc. The device 20 may also include other various types of input devices or sensors, including a microphone 34, and other sensors 42 that allow users and/or the environment to provide input to the device 20. The microphone 34 may provide sound detection and processing, including allowing a user to perform voice communications, record audio, and control devices and applications using voice commands, speech recognition, or other input through sounds. The other sensors 42 may be any type of sensor devices such as accelerometers, compasses, orientation sensors, sensors for various RF signals (including RFID) sensors for infrared signals and data, vibration or impact sensors, etc. Other types of input devices, such as keyboards, buttons, etc are also possible (not shown).

Any of the input devices, display 26, and processor 24 may work in concert with instructions stored in memory 30, 32, to form a graphical user interface (GUI), which allows a user to interact with the device 20 and any applications on the device or available over a wireless network. An example feature is an ability for users to interact with applications running on the GUI, such as communications applications, games, etc. These software applications, as well as operating system instructions and updates may be received over the wireless network, and stored in the memories 30, 32, and executed by the processor 24. Some applications such as browsers may allow users to access online stores and other portals over the wireless network, and to purchase and/or download features, such as music files, applications, images and video, and other items.

Embodiments of the present invention present an intuitive application for producing percussion sounds and tracks that utilizes screen real estate well and allow maximum flexibility for users. Users can view songs, rhythm patterns and individual parts from a high level, and quickly focus in on particular patterns or parts to edit or add new rhythms or parts.

Figure 2:
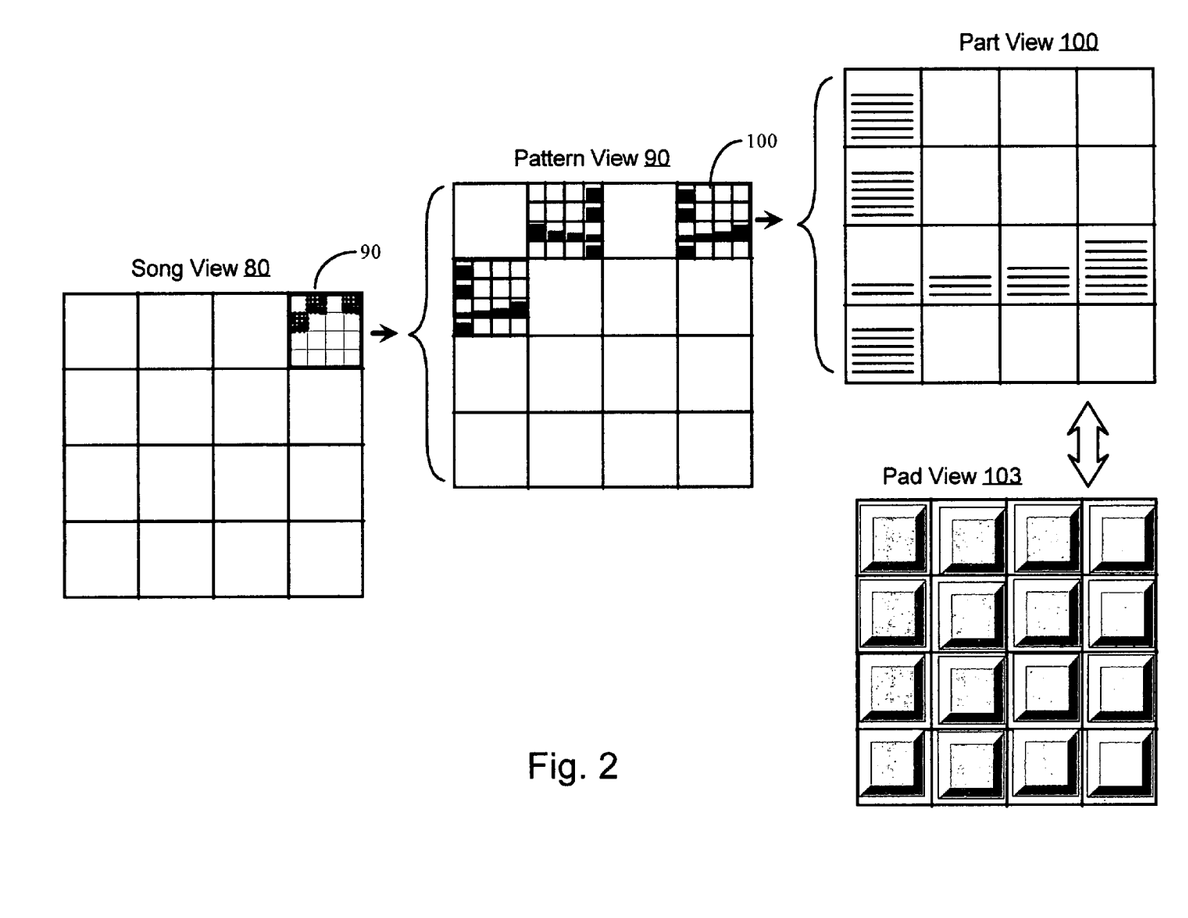
FIG. 2 illustrates a display and interface feature of some embodiments of the present invention.

FIG. 2 shows an interface according to one or more embodiments of an invention. An embodiment may provide multiple views, for example song view 80, pattern view 90, and part view 100. Views may be provided by different interface screens, which allow viewing and modifying of the elements that make up the rhythms and/or song. The song view 80 may include multiple patterns 90 displayed in a grid, whereupon a user may select a pattern and then be provided with the selected pattern in a pattern view 90. From the pattern view 90, a user may select a part, and then be provided with the selected part in a part view 100. A pad view 103 may also be provided, allowing users different ways to create and edit parts and patterns. More description of each view will be provided below. The interface may provide animated zooming in and out between the different views. pattern views and other views. Other interface screens and views are possible and provide other options to view and modify the rhythms and sounds.

The example song view 80 and pattern view 90 in FIG. 2 are shown with only a few sub-views for clarity. As will be explained below, each view may hold many sub-views, and the subviews may be arranged and re-arranged based on the rhythms.

All the different views shown in FIG. 2 utilize a 4×4 square grid theme. A 4×4 square grid works well for songs and rhythms that are based on a 4/4 time signature, although other time signatures also work with this size grid. Other size and shapes of grids may be utilized for one or multiple views. For music with different time signatures or bars, a different grid may be utilized, for example a 3×3 grid for music with three or six beats per measure. Further, a grid does not necessarily need to be square, but can be adjusted as appropriate for the available screen size and shape, and type of music or rhythms featured. The choice of grid may be dynamically selected based on the selected rhythm.

Figure 3:
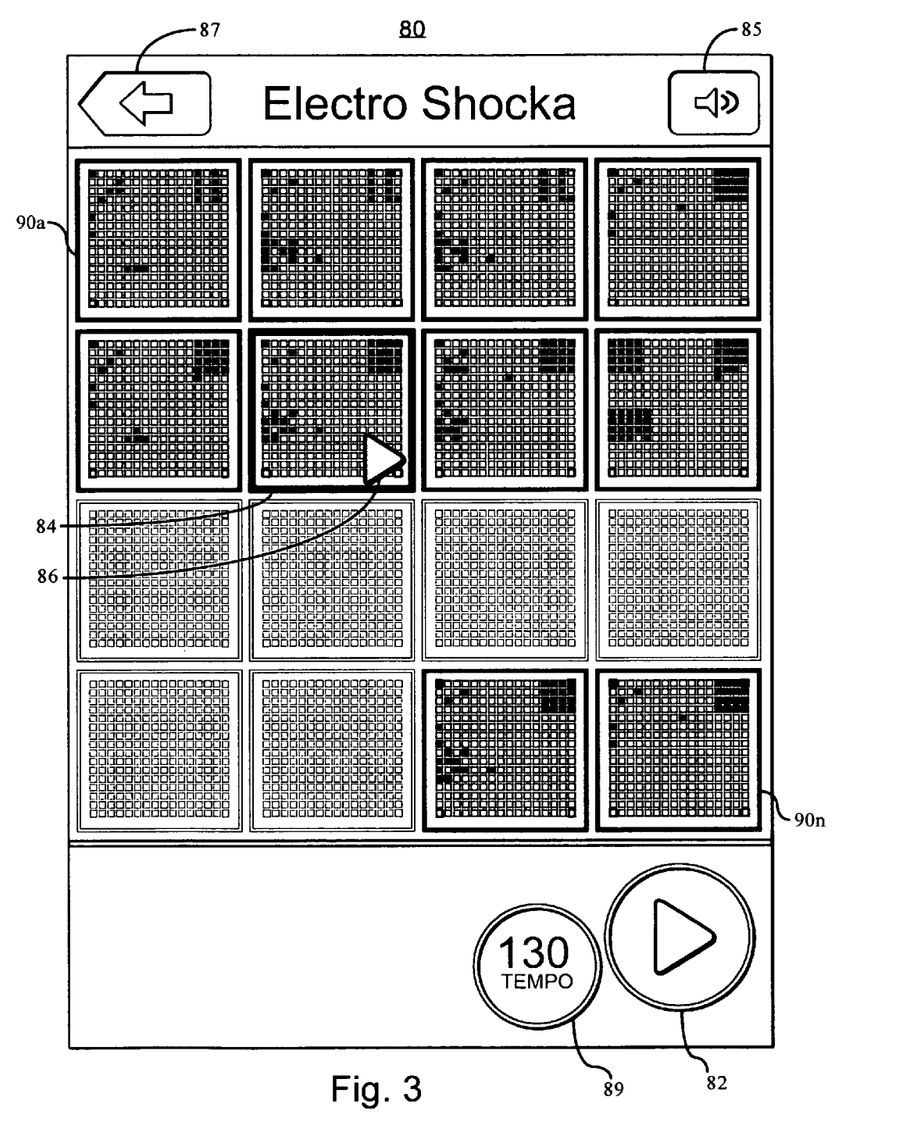
FIG. 3 illustrates an example song view interface according to one or more embodiments.

FIG. 3 shows an example GUI (graphic user interface) according to one or more embodiments. The interface view in this FIG. 3 includes a song view 80. The song view shows an overview of the patterns 90 within a particular song or kit, and allows a user to organize multiple patterns into a song. The patterns are presented in a 4×4 matrix grid, thereby displaying 16 patterns at once. In one or more embodiments, a song can be made of up to 16 patterns 90. Each of these 16 patterns 90 shares the same sounds and tempo (speed), but each pattern 90 can have a completely different rhythm. If a song includes more than 16 patterns, one or more paged song views may be provided to show the additional patterns.

A user may start a song playing by tapping the play button 82. The embodiment will then play through connected patterns in order starting from top left through the row, then the next row down, continuing to the bottom right. The currently playing pattern 90 may be emphasized for example by a different color or thicker outline 84 surrounding the pattern, and/or a play icon 86 located on or near the playing pattern.

In some embodiments, a group of connected patterns 90 are referred to as an island. When an embodiment reaches an empty pattern (the end of an island) it may loop back to the beginning of the island. This allows a user to separate and organize different sections of a song or even perform by jumping between islands while the embodiment is playing. A user may select a different island, and the border of the selected pattern 90 will blink until the current pattern has finished playing, whereupon the embodiment will jump to the new pattern and start playing.

A user may copy a pattern 90 by touching and holding a pattern in the grid, and dragging the pattern to an empty square to create a copy of the pattern. If a pattern is dragged to a square already containing a pattern, the dragged pattern overwrites the previous pattern. Users may change the order of patterns by first copying the desired patterns to empty spaces on the grid, and then dragging them to different squares to form a playback order. Users may also erase unwanted patterns by dragging them off of the grid.

The song view 80 may include other GUI features, including for example a volume control 85, a back button 87, and a tempo button 89. The tempo button 89 may set the speed, or tempo, at which an embodiment will play back the current kit (or song) and its patterns. A user may tap the button in rhythm at the speed the user desires, and the embodiment will interpret the taps to set the tempo of the song. Alternatively a user can hold the tempo button and drag up to increase the tempo, or drag to the left to decrease the tempo.

If a user wishes to edit a pattern 90 or create a new pattern 90, the user may tap a pattern's box in the song view to edit the pattern 90. To create a pattern from scratch, the user simply taps on a blank box. The embodiment will switch (or zoom) the GUI from song view 80 to pattern view 90 to allow the user to view and edit patterns.

Figure 4:
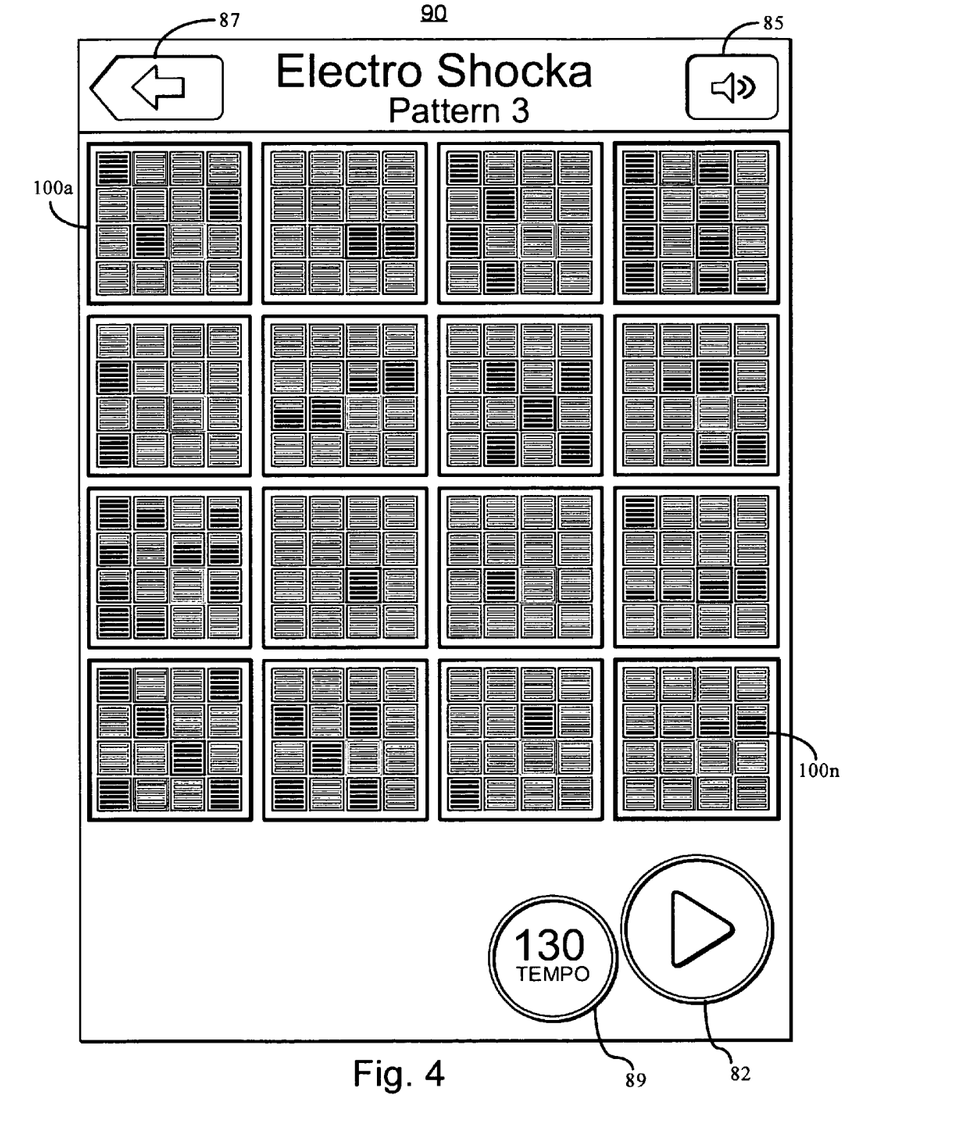
FIG. 4 illustrates an example pattern view interface according to one or more embodiments.

A pattern view for one or more embodiments is shown in FIG. 4. This view displays an overview (grid) of all of the parts 100 contained within the selected pattern 90. For this embodiment, a pattern is made up of up to 16 parts displayed in a 4×4 matrix grid. Each part 100 displays a different sound. Parts 100 may be displayed with a different color or other discriminating feature. For one embodiment, a part color may indicate a type of sound or instrument, for example blue indicating kick drums (bass drums); yellow indicating hi hats; red indicating snare drums; orange indicating percussion (includes sounds like claps, cymbals and hand drums) and purple indicating effects (includes sound effects and musical sounds). Other colors may be utilized, or for indicating different features about a part. When an embodiment is playing while in pattern view, only the displayed pattern will play, in a loop.

In pattern view FIG. 4, a user may clear all the parts 100 presently within a pattern by shaking the device 20 multiple times. Other methods for clearing or erasing patterns may be utilized, depending on available features of a device 20 or its user interface features. Embodiments may also include a mute mode, where the user can silence sounds in a pattern 90 by pressing a mute button (not shown). A user may also use this feature to hear how different parts work together by silencing other parts, or to "perform" with the current pattern by turning parts on or off dynamically.

A user may edit a part by tapping the selected part 100 in the pattern view grid. This may cause the GUI to zoom in to the selected part 100 to allow the user to view and edit the part 100.

Figure 5:
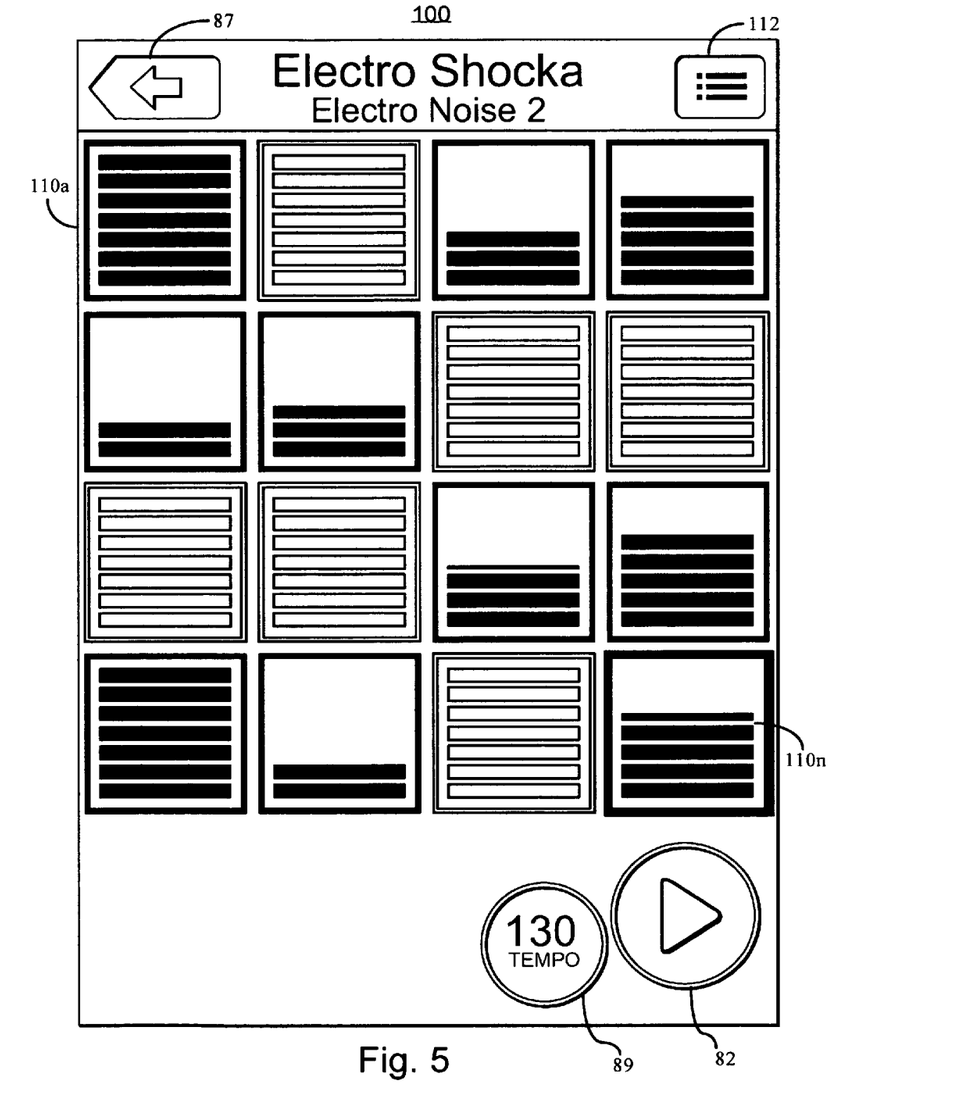
FIG. 5 illustrates an example part view interface according to one or more embodiments.

FIG. 5 shows a part view according to one or more embodiments. Each part 100 is made up of a sound and 16 steps 110 that can be used to create a rhythm with that sound. Similar to the other views, the steps are arranged in a 4×4 matrix grid. The part view allows a user to change the rhythm of individual sounds within a pattern 90. A user may also change the sound of a part 100 in this view by browsing through additional percussion (and other) sounds and samples.

Each step 110 represents a beat of the rhythm. Therefore for this embodiment the grid displays 16 beats at a time. As a pattern plays back, each step 110 determines when the sound is triggered, allowing a user to create and change rhythms by turning steps on or off. A user may tap on a step 110 in the part view to turn that step on or off. When the step is turned on, it may change appearance, such as glowing, or with different color or appearance, for example with thicker lines and appearance as indicated in FIG. 5.

In addition to just turning a step 110 on or off, the GUI for one or more embodiments allows a user to control how loud each individual step is. When a step 110 is on, a user may touch the step and drag her finger up or down to adjust the sound volume for that step. This allows variations in how loud the sounds in a pattern are. Users may adjust multiple steps in a row at once, for example dragging their finger horizontally across the steps to set a similar volume for all steps in the row, or dragging horizontally and up to cause increasing loudness for each step in that row, or horizontally and down to cause decreasing loudness for each step. Multiple fingers may be used to alter multiple steps at the same time. Further, to quickly reset a step's loudness value, a user may double-tap on the step.

All these adjustments to steps may be performed while the song is playing. Each step is highlighted as it plays, starting from the top left and traversing by rows until the bottom right.

All changes to the steps made by a user are heard immediately. The display matrix allows users to view and modify a large number of steps for the part 100. Further, the display arrangement allows intuitive movements and gestures to modify the various elements of a song. For example, if the music has a time signature of 4 beats per measure, a user can quickly activate (or deactivate) a step on the first beat of each measure by dragging vertically down the first column of the grid. A similar action in any of the next three columns will add steps on the second, third or fourth beat of each measure.

In pattern mode, FIG. 4, an embodiment indicates the playing beat by highlighting the parts within the pattern 100. So on the first beat, each part 100 that is active will have the first (top left) step highlighted, followed by the next step in the row, etc. In other words, the pattern view shows indicates playback in a similar way as a part view, only the pattern view typically will be showing multiple parts simultaneously.

A user may tap on a solo button (not shown) to mute all other sounds in the song or kit. This allows the user to hear just the part the user is working with. Tapping the solo button again will disable the solo mode.

An embodiment may support other gestures in the part view 100 FIG. 5 to aid a user in viewing and modifying parts. A user may flick the part view to navigate to adjacent parts. A flick gesture (e.g. moving the finger touching the screen rapidly in a certain direction) to the left will move to the next part, while a flick gesture up will move to the part below the current part, etc. To clear all the steps in a part, the user may shake the device 20.

Users may select a particular sound for the part by tapping the menu button 112. This may bring up a sound selection menu (not shown) where a user can scroll through a library of available sounds and select a sound to assign it to the current part. The selection menu may provide a selectable filter to select certain types of sounds, for example a user may select a color shown at the top of the screen, and thereby to only search through one type of sound (Kick Drums, FX, etc. as previously described in terms of colors), or the viewer may select to view all of the sounds at once. If an embodiment is currently playing a song, selecting an item from the list may preview the new sound as part of the current pattern. If a song is not playing a user may preview a sound, by tapping a play button next to the sound's name.

Although some embodiments have been described in terms of drum or percussion sounds, any type of sounds may be utilized, including samples, MIDI-produced sounds, or notes from any type of musical instrument. For some embodiments, sounds are stored as audio files in any available format and quality. For some embodiments, a sound file comprises an MP3 audio file of the particular sound.

Embodiments may also provide additional user interface screens, such as a GUI screen to allow editing of parts or sounds. If a user taps an overlay button in the lower left corner of the Part view (not shown) a volume and pan overlay screen may be displayed. This screen allows a user to change the overall volume of a part, and to pan the sound left or right. The screen may have one or more slider controls to adjust such parameters. Alternatively, a screen may display a two dimensional area with a point indicating the present volume and panning for the sound. Such a display is similar to a joystick control that adjusts the sound volume by vertical movement of the joystick, and adjusts the panning (stereo balance) of the sound by horizontal movement. A user may adjust the sound by moving the point up or down to increase and decrease volume, and move the point left and right to pan the sound left and right.

Embodiments may provide other ways to create and edits songs and patterns. While viewing the pattern mode of FIG. 4, users may tap a "pad" button in the lower left corner of the pattern view (not shown) to enter pad mode. In pad mode, a screen is displayed with a similar 4×4 grid of squares. And example pad mode view 103 is shown in FIG. 2. The squares work as drum pads, wherein a user may simply tap on squares in the grid to trigger their sounds, allowing the user to play out a rhythm with her fingers. A user can use multiple fingers to tap more than one pad at the same time. As a pad is tapped, it may highlight or provide other visual feedback (for example a 3D button pushed effect) to indicate that it was tapped. The pads may be provided with images to help identify the type of sound assigned to a pad, or colored based on the color scheme previously described.

To record a pattern by tapping the pads, a user may tap the record button next to the pad (not shown) and then tap at appropriate times. As the pattern repeats, an embodiment will remember which pads were tapped, and will incorporate the user's performance into the current pattern. The pads may highlight as they are triggered. The user instantly sees and hears the part incorporated into the pattern, and can continue to tap on pads to add more parts to the rhythm. This interaction allows a user to rapidly develop percussion patterns. An embodiment may also correct a user's imperfect timing while tapping the pads by automatically correcting the user's timing as the pattern repeats. It does this by associating the user press timing with the closest step by quantization. If a user makes a mistake and wants to clear the rhythm on a pad, the user can just touch and hold the pad for a couple of seconds until it flashes.

Another adjustment provided by some embodiments is a "choke group". This feature may allow one sound to be cut off by the start of another sound. Put another way, one sound in a kit will "gate" or "choke" another sound. For example, a user may want to stop an open hi-hat sound from sustaining whenever a closed hi-hat is triggered. An embodiment may have multiple available groups to choose from. To assign a part to a choke group, a user may enter pad mode, and touch and hold a button or a certain part of the screen. While holding, the user can use another finger to hold one of the pads. In a few seconds, numbers will appear over the pads (not shown). The user may then tap the pad that she wants to assign to a choke group until she reaches the choke group number she wants to use. When assigning a choke group, the number of the sample's choke group is displayed on top of that pad. Tapping on the pad will cycle through the available choke groups. The choke group displayed on the pad is the choke group for the sample loaded into it.

Embodiments may include other views and interface screens for functions, such as loading songs, creating new songs, and renaming or deleting songs. In some embodiments a song may be referred to as a drum kit. To load a song or drum kit, a selection screen may appear and provide a scrollable list of available songs. When used on a touch screen interface, a user can and slide their finger up or down to scroll through the list, or flick to scroll quickly. When an item in the list is selected, it may automatically play a preview of the song. Songs and other content may be available locally in memory in a device, or available from a networked server. Some content may be downloadable for free, or only after some form of payment. Further, some content may be available but locked until it is unlocked by some payment or a user completing a certain amount of playing time or achieving a certain level of skill.

To select a song and edit its sounds and patterns, the user may select an "open" or arrow button next to the song's name in the list. To make a copy of a song a user may "copy" or + button, wherein an embodiment will prompt the user to enter a name for the new kit, using a touch screen keyboard or other data entry method. A user may create a new (blank) song by copying an existing song and then deleting all its patterns. Some embodiments may automatically save all changes a user makes to a song without any need to explicitly save any changes. If a user accidently modifies or deletes one of the songs, if necessary a user may "reset" the song content to the original content provided with the embodiment.

Figure 6:
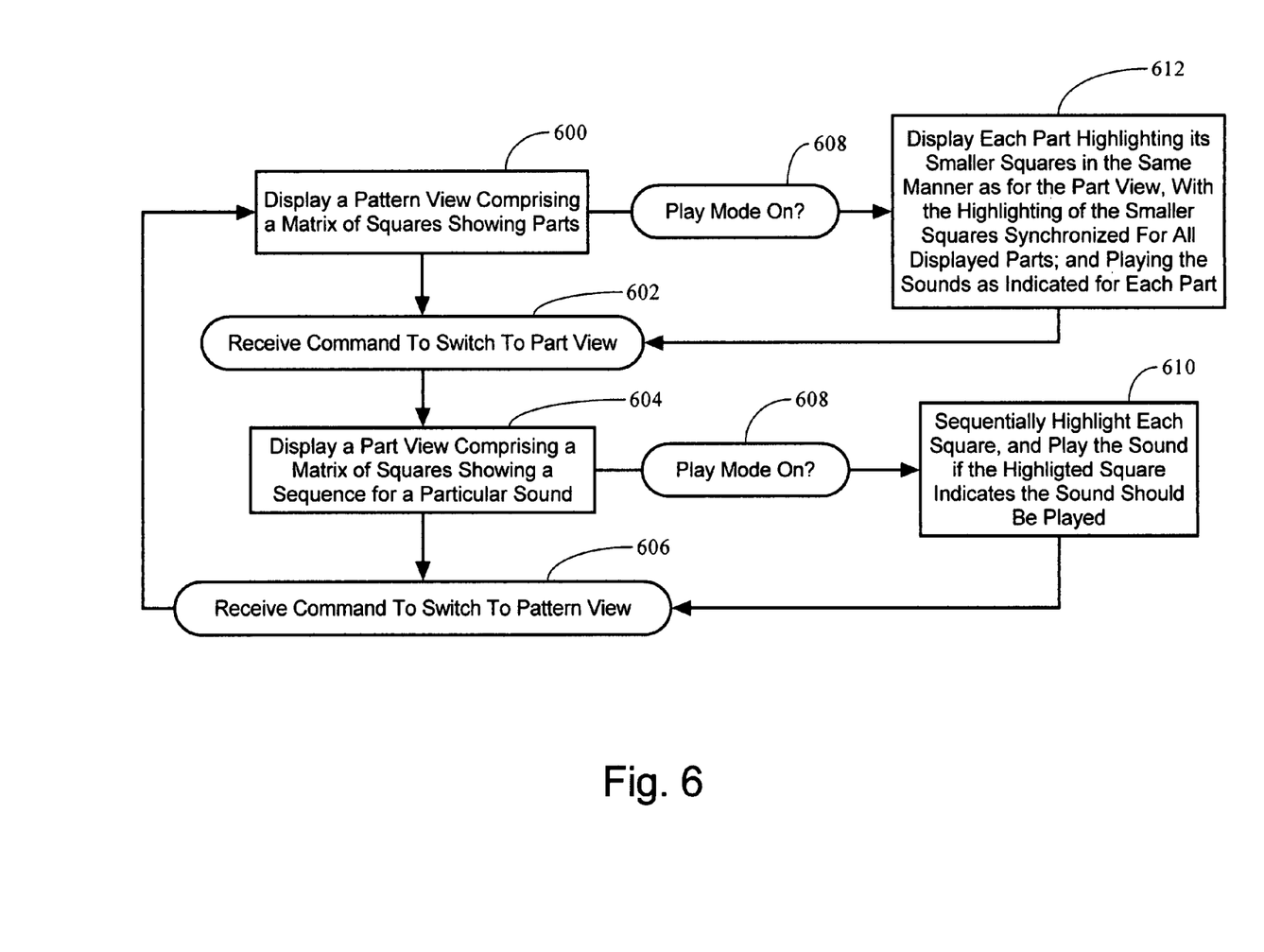
FIG. 6 illustrates a method utilized by one or more embodiments.

FIG. 6 illustrates steps performed by one or more embodiments. At step 600, a processor displays a pattern view, such as a pattern view 80 of FIG. 2. If a command or signal is received to switch or focus in on a part view, step 602 FIG. 6, then the processor will then display the part view, step 604. If a command or signal is received to switch to pattern view, step 606, then the pattern view will again be displayed, step 600. Other views may also be switched to and displayed.

If a part view is displayed, step 604, and the embodiment is in play mode, as indicated by item 608, then the embodiment may display highlighting, step 610. This includes sequentially highlighting each square within the part view, and playing the sound associated with that part if the highlighted square indicates that the sound should be played. A square may indicate a volume level, wherein the sound will be played at the indicated volume level. Similarly, if a pattern view is displayed, step 600, and play mode is on, as indicated by item 608, then the embodiment may display highlighting, step 612. In this pattern mode, each part mode displayed within the pattern mode will individually sequentially highlight each square within the part mode, but all the displayed parts will do this simultaneously. Users can switch back and forth between the various views whether in play mode or otherwise.

Embodiments of the present invention may run on devices such as the iPhone® and iPod Touch available from Apple, Inc. Such embodiments may be available for download as an "App" and may come preloaded with songs and drum kits for certain genres or artists. Alternatively users may import other sounds and samples, record their own. A downloaded App may be stored in non-volatile memory 32 FIG. 1, and may utilize volatile memory 30 when activated. Such Apps may utilize the Apple Developers Kit, which provides interface functions and features for utilizing a touch screen for user input. The iPhone OS API (Operating System Application Program Interface) provides functions which get called to notify an App of user interaction, such as touching the screen. It also provides useful UI (user interface) classes for displaying graphics and controls, and also for implementing zooming.

An implementation of one embodiment is built with version 2.0 of the iPhone SDK, but is compatible with all versions of iPhone OS. Such an embodiment makes use of a callback function (for this embodiment it uses the RemoteIO Audio Unit). This callback gets called by the system whenever a new buffer of audio is required. The embodiment writes audio data to the buffer; and the system eventually outputs the audio to the speakers/lineouts/headphone/etc. The data which gets written is determined by what voices are currently playing. A voice in this context refers to an instance of a segment of audio playing back. A voice keeps track of its position in the source audio data, and uses this location to copy the appropriate frames to the output buffer. A voice can get triggered when the user hits (activates) the pads, or when the sequencer encounters a note during playback.

This embodiment uses the stream of audio buffers provided by the callback as a clock to determine when to trigger voices during playback. The embodiment counts the number of sample frames it receives so that it knows when to trigger the voices which occur for a specific note in the sequence.

With some embodiments, users are able to record their own custom samples. Sound samples may be any sound and any length. Sound samples for a kit are stored as either compressed or uncompressed audio files. They are stored in folders in nonvolatile memory. These folders may be used to group the samples according to type. For example, there may be a separate folder for kick drums, snares, and effects. Organizing the files in these directories allows an embodiment to know what type of sound each sample is.

In one or more embodiments, song files include all the sequence data for the kit in addition to properties of the song, such as tempo and swing. The song files also store the file paths of the samples which the song uses. When the kit is loaded, these samples are loaded into nonvolatile memory. As noted, the sequence data is stored in the song file. Since the audio is output on a high priority thread and typical user operations happen in the application's UI (user interface) thread, a lock-free FIFO data structure is utilized to communicate changes which occur as a response to user interaction.

Such Apps may include other functionality, for example allowing wireless access to Internet databases and resources. For example, an App may provide wireless connections for a user to obtain more songs or kits, or to receive information about artists or producers of various songs or kits, such as touring information or options to download related content and songs.

Other embodiments may allow user created and modified songs to be stored as audio files, and transmitted to others or utilized in various ways, such as for ringtones. Some embodiments allow importing and exporting samples, songs, and kits etc. with embodiments running on other platforms, such as PCs. Further, some embodiments may utilize networking (wired or wireless) to allow multiple users with different devices to access, play, and modify songs in real-time and have a multi-player mode "jam session" or "virtual drum circle". A particular device or server may provide the final output audio for the playing collaborative song, with individual networked devices providing users with the ability to add parts and patterns in real time during playback. Some or all users may be limited by what types of parts they may play for the song, or be restricted in other ways such as a time limit for how long their device may provide input to the song, etc.

Although described in terms of touch screen displays, embodiments may utilize any type of display, including computer monitors, TV screens, LCD and LED displays, etc., and also any type of input device including touchpads joysticks, mice, proximity sensors, keyboards, video game controls, wireless pointing devices, audio input, voice command input, etc.

One or more aspects of the invention may be embodied in computer-usable data and computer-executable instructions, such as in one or more program modules, executed by one or more computers, processors, or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Further, embodiments may be embedded in the hardware or firmware of new equipment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A user interface display for an audio sequencing device, comprising:
   a part view comprising a square matrix of squares, wherein the squares in the matrix visually indicate a sequence of when a specific sound is to be played, and wherein when the sound sequence is being played, the part view matrix squares are highlighted sequentially as the indicated specific sound is played; and
   a pattern view comprising a square matrix of squares, wherein at least one square in the pattern view matrix displays a part view related to the pattern view, and wherein when the pattern view is displayed and a song is being played, the part view matrix squares are still highlighted sequentially as the indicated specific sound is played;
   wherein when a user is viewing the pattern view, the user may select one of the squares in the pattern view matrix, whereupon the selected part view will expand and be displayed instead of the pattern view.

2. The user interface display of claim 1, wherein each square in the part view matrix visually indicates a volume for the audio sound for when the sequence is played.

3. The user interface display of claim 1, further including:
   a song view, comprising a square matrix of squares wherein at least one square within the song view matrix comprises a pattern view, wherein when a user is viewing the song view, the user may select one of the squares in the song view matrix, whereupon the selected pattern view will expand and be displayed instead of the song view.

4. The user interface display of claim 1, wherein the parts view shows parts in different colors based on a type of instrument related to the audio sound.

5. The user interface display of claim 1, wherein in the part view, each square in the matrix indicates a volume level by one or more lines that substantially fill the square for a high volume level indication, wherein consecutively fewer lines indicating lower volume level.

6. The user interface display of claim 1, including an input feature wherein a user may indicate a tempo by sequentially activating the input feature at a speed to indicate the desired tempo.

7. The user interface display of claim 1, wherein the specific sound is stored in an audio file.

8. A method of displaying a sequence of sounds to be played, comprising:
   displaying by a processor, a pattern view on a display device, wherein the pattern view comprises a square matrix of squares, wherein at least one square within the matrix displays a part view;
   upon receiving a signal, enlarging and displaying by a processor one of the part views on the display device, wherein the part view enlarges and replaces the pattern view, and wherein the part view comprises a square matrix of squares, and wherein each square in the part view matrix visually indicates whether a specific sound is played at a specific time in a sequence; and
   when in play mode, sequentially highlighting each of the part view matrix squares, and simultaneously producing audio output if the highlighted square indicates that the specific sound should be played, wherein each square in the part view matrix visually indicates whether a specific sound is played at a specific time in a sequence even when displaying the pattern view on the display device.

9. The method of claim 8 wherein the step of displaying a pattern view includes:
   if in play mode, for each part view in the pattern view, sequentially highlighting each square in the part view, and simultaneously producing audio output if the highlighted square indicates that the specific sound should be played;
   wherein sequentially highlighting of each square in the part view is synchronized for all part views displayed in the pattern view.

10. The method of claim 8 wherein producing audio output includes producing audio output at a volume level as indicated in the highlighted square.

11. The method of claim 8, further including:
    displaying by a processor, a song view on the display device, wherein the song view comprises a square matrix of squares, wherein at least one square within the matrix displays a pattern view; and
    wherein upon receiving a signal, enlarging and displaying by a processor one of the pattern views on the display device, wherein the pattern view enlarges and replaces the song view.

12. A non-transitory computer readable medium including executable instructions that when provided to a processor, cause the processor to perform:
    displaying a pattern view on a display device, wherein the pattern view comprises a square matrix of squares, wherein at least one square within the matrix displays a part view;
    upon receiving a signal, enlarging and displaying one of the part views on the display device, wherein the part view replaces that pattern view, and wherein the part view comprises a square matrix of squares, and wherein each square in the matrix visually indicates whether a specific sound is played at a specific time in a sequence; and
    when in play mode, sequentially highlighting each of the part view matrix squares, and simultaneously producing audio output if the highlighted square indicates that the specific sound should be played, wherein each square in the part view matrix visually indicates whether a specific sound is played at a specific time in a sequence even when displaying the pattern view on the display device.

13. The non-transitory computer readable medium of claim 12, further including executable instructions that cause the processor to perform:
    while displaying a pattern view, if in play mode, for each part view in the pattern view, sequentially highlighting each square in the part view, and simultaneously producing audio output if the highlighted square indicates that the specific sound should be played;
    wherein sequentially highlighting of each square in the part view is synchronized for all part views displayed in the pattern view.

14. The non-transitory computer readable medium of claim 12 further including executable instructions that cause the processor to perform producing audio output at a volume level as indicated in the highlighted square.

15. The non-transitory computer readable medium of claim 12, further including executable instructions that cause the processor to perform:

displaying a song view on the display device, wherein the song view comprises a matrix of squares, wherein at least one square within the matrix displays a pattern view; and wherein upon receiving a signal, enlarging and displaying by a processor one of the pattern views on the display device, wherein the pattern view enlarges and replaces the song view.

* * * * *